United States Patent
Mizikovsky et al.

(10) Patent No.: US 6,697,490 B1
(45) Date of Patent: Feb. 24, 2004

(54) AUTOMATIC RESYNCHRONIZATION OF CRYPTO-SYNC INFORMATION

(75) Inventors: Semyon B. Mizikovsky, Morganville, NJ (US); Milton A Soler, Oak Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/422,205

(22) Filed: Oct. 19, 1999

(51) Int. Cl.[7] .............................................. G06F 11/30
(52) U.S. Cl. ........................ 380/262; 380/274; 380/278; 380/283
(58) Field of Search ................................ 380/262, 274, 380/278, 283, 44, 28

(56) References Cited

U.S. PATENT DOCUMENTS

| | | | |
|---|---|---|---|
| 4,071,693 A | 1/1978 | Frutiger | 178/69.1 |
| 4,605,921 A * | 8/1986 | Riddle et al. | 714/753 |
| 5,768,378 A * | 6/1998 | Townsend et al. | 380/256 |

FOREIGN PATENT DOCUMENTS

| | | | |
|---|---|---|---|
| EP | 0 162 962 A | 12/1985 | H04L/9/00 |
| EP | 0 446 194 A | 9/1991 | H04B/7/26 |
| EP | 0 792 041 A | 8/1997 | H04L/9/06 |

OTHER PUBLICATIONS

European Search Report.

* cited by examiner

*Primary Examiner*—Thomas R. Peeso

(57) ABSTRACT

An apparatus and method for transmitting and receiving cryptographic information which provide a mechanism for resynchronization between a transmitter and receiver of the cryptographic information. A cryptographic synchronization counter at the transmitter generates a transmitter signature tag. A corresponding cryptographic synchronization counter at the receiver generates a receiver signature tag. Information is ciphered and the transmitter signature tag is appended to the ciphered information. The ciphered information is received. The transmitter signature tag is compared to the receiver signature tag and the cipher text is decipher into plain text if the tags are equal. If the tags are not equal, the receiver crypto-sync counter is incremented and a new receiver signature tag is calculated to determine if the receiver is resynchronized (i.e., tags are equal) to the transmitter. If after a certain number of increments, resynchronization does not occur, a resynchronization procedure is initiated.

14 Claims, 2 Drawing Sheets

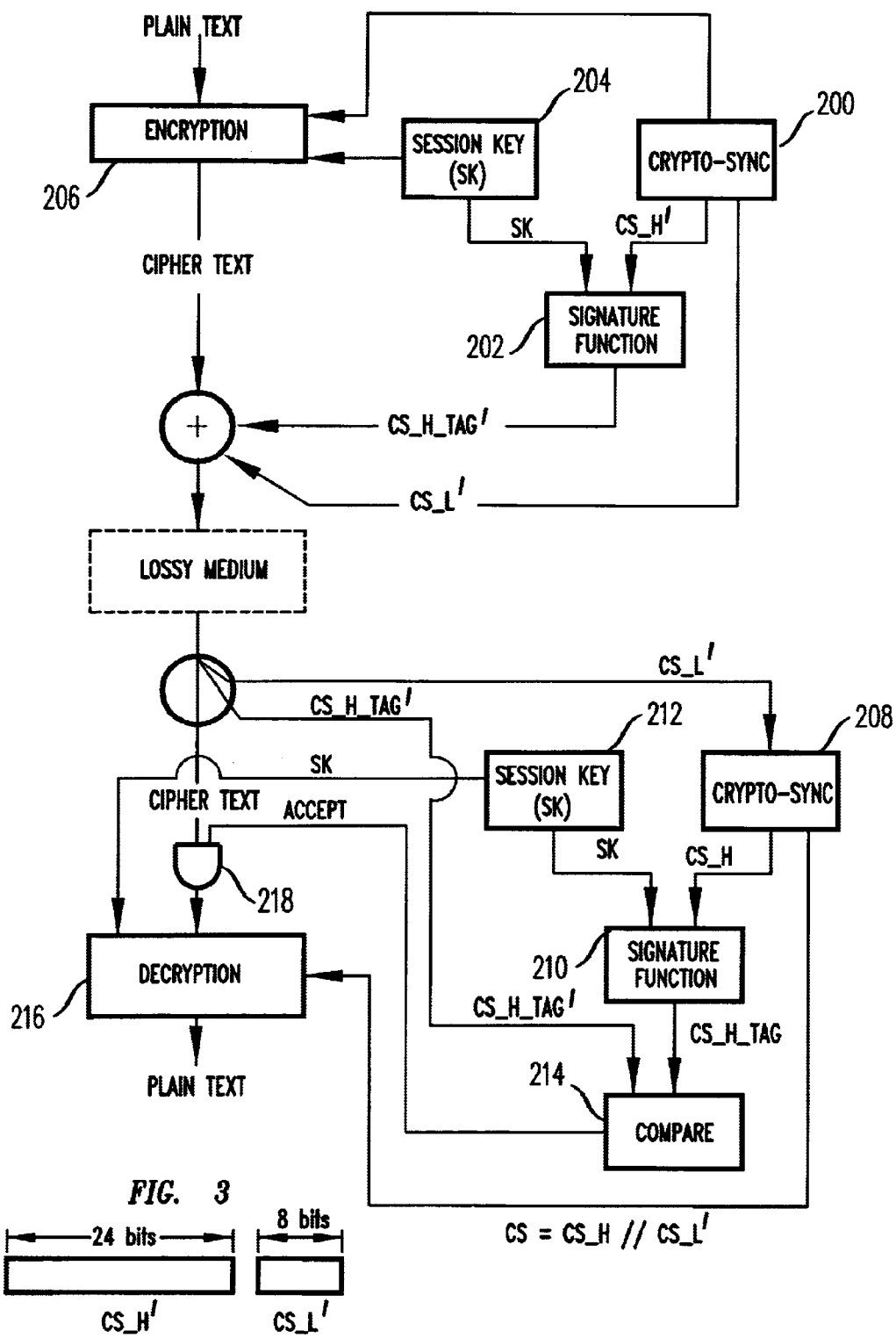

AUTOMATIC RESYNCHRONIZATION OF CRYPTO-SYNC INFORMATION

BACKGROUND OF THE INVENTION

1. Field of the Invention

The present invention generally relates to cryptographic algorithms and in particular to an algorithm and apparatus that perform an automatic resynchronization of a certain type of cryptographic information known as cryptographic synchronization.

2. Description of the Related Art

The security of information conveyed over communication systems is a main source of concern for those who provide communication services to subscribers, viz., system operators. With the growing use of communication systems such as the Internet and wireless communication systems (e.g., cellular communication), information security has become an important consideration for system operators. Also, entities (e.g., individuals, corporations) who subscribe to widely used communication systems are also concerned about the security of their information. Often, the information conveyed over a widely used public communication system such as the Internet is sensitive information that is to be disclosed to only an intended parties.

One of the more effective techniques used by communication system operators is to encrypt information before such information is conveyed over a system. The intended receiver of the information is provided with the proper decryption equipment. The science and technology of keeping information secret from unauthorized parties by using a code or cipher is known as Cryptography, *Cryptography's Role In Securing The Information Society*, Kenneth W. Dam and Herbert S. Lin, Editors, National Academy Press 1996. In a basic form of Cryptography, the information is first encrypted and then transmitted over a communication system. Associated with the encryption applied to the information is a secret procedure or "key" that allows one to decrypt the encrypted information. In some cryptographic schemes, the key is known only to the authorized recipient of the information and the system operator. In other schemes, the key is public knowledge.

Referring to FIG. 1, there is shown a typical cryptographic scheme in which the "key" is public knowledge. A transmitter transmits information (i.e., plain text provided by module 106) over lossy medium 108 to a receiver. Plain text is any type of unencrypted information (e.g., digital data, digitized voice or video) that is conveyed over lossy medium 108. Prior to being transmitted over lossy medium 108, the plain text is encrypted into cipher text by module 108. The lossy medium is any actual medium (e.g., twisted pair wires, coaxial cable, air, fiber optic cable) through which communication signals are conveyed (i.e., transmitted and received) and experience adverse conditions possibly resulting in corrupted or loss of information.

The length of time elapsed during the initiation, conveyance and termination of communications between at least two subscribers of a communication system is called a session. At the beginning of the session, the cryptographic scheme depicted in FIG. 1 designates a key for the session, viz., the session key. At the transmitter, module 102 provides a session key for each session. Module 104 contains cryptographic synchronization (hereinafter "crypto-sync") information which is used by encryption module 100 to encrypt the plain text provided by module 106.

The crypto-sync information enhances the ciphering of the plain text by providing variability to the ciphering process. For example, identical messages transmitted at different times and encrypted with different crypto-sync will have different cipher text. The cipher text is received and then decrypted back into plain text. The decryption is performed by module 110 which uses the session key from module 112 and crypto-sync information from module 114 to derive the plain text. The crypto-sync not only adds variability to the ciphered text but also enables the receiver decryption module to be synchronized with the transmitter encryption module. In other words, the particular encryption procedure applied to plain text has an associated decryption procedure which is applied to the cipher text. When the proper decryption is applied to the cipher text, the result is the plain text. Otherwise, the cipher text will not be decrypted properly.

At the beginning of a session crypto-sync modules 104 and 114 at the transmitter and receiver respectively are set to an initial value. Thus, the transmitter and receiver are synchronized. At the transmitter, the crypto-sync value is then incremented (by one) for each plain text message transmitted. Correspondingly, at the receiver, the crypto-sync value is incremented for each cipher text message received thus maintaining synchronization with the transmitter. The crypto-sync modules (104, 114) are therefore, usually implemented as counters whose initial values are set at the beginning of a session. To conserve communication bandwidth, (communication bandwidth represent the limits on the amount of information that can be conveyed in a communication system) only a portion of the contents of this counter is actually transmitted from the transmitter to the receiver with every message, while the remaining portion of the contents of the counter is independently maintained by both transmitter and receiver. When the portion that is transmitted exceeds its maximum value, the remaining portion is incremented by both sides. Therefore, to ensure proper decryption the receiver has to maintain an integrity of the remaining portion even when some messages are lost during transmission and are not received.

Although not shown in FIG. 1, a Cyclic Redundancy Code (CRC) is appended to the plain text and the combined information (i.e., plain text and CRC) is encrypted using the crypto-sync value and the session key value. The CRC is a well known coding technique that is used to determine the occurrence of errors in information exposed to lossy media. The encryption and decryption performed are usually proprietary cryptographic procedures (i.e., cipher and decipher) known only to certain entities such as standards bodies and communication equipment manufacturers. At the receiver, module 110 deciphers the combined information resulting in plain text and the CRC. The session keys at modules 102 and 112 of the transmitter and receiver respectively are known and are the same. The crypto-sync value should be the same at the receiver as the crypto-sync value used at the transmitter; otherwise the transmitter is not synchronized to the receiver. To determine whether synchronization is maintained at the receiver, a CRC check is performed on the plain text. If the occurrence of errors has not been detected, the plain text is accepted and is then transferred to various processing equipment represented by module 122 for any necessary further processing. If the occurrence of errors has been detected, it is an indication that the receiver and transmitter are no longer synchronized to each other; that is, the crypto-sync values at the transmitter and the receiver are not equal to each other. Consequently, a cryptographic resynchronization procedure is initiated by module 120. Typically, the resynchronization procedure involves exchange of messages between the transmitter and the receiver and the termination of the session currently in progress to allow for the crypto-sync counters at both the transmitter and receiver to be reset to a designated initial value. A new session can then be started. Also, the integrity of the received cipher text is validated with the use of well known techniques (such as error detection schemes).

A disadvantage in using the CRC to check for errors is that the length of the CRC is relatively lengthy thus reducing the amount of information that can be transmitted in one session; the use of the CRC represents an inefficient use of communication bandwidth. Another disadvantage in using the CRC of the plain text is that it has to be calculated for every message, as the plain text contained in it will be different every time. A further disadvantage in using the CRC method discussed above is that when the transmitter loses synchronization with the receiver, the session is terminated as there is no mechanism provided for resynchronization without having to end the session. Yet an even further disadvantage in using the CRC method discussed above is that the complete decryption shall be done by the receiver using assumed decryption parameters (i.e., SK and CS), followed by the CRC check, before receiver discovers that synchronization with the transmitter has been lost. In many cases when the transmitter loses synchronization with the receiver, the crypto-sync counter values (at the receiver and transmitter) are different by several counts. In such cases, synchronization can be recovered if the two counters can somehow be realigned with the same counter values.

What is therefore needed is a method for detecting lost of synchronization between a transmitter and receiver without the use of relatively lengthy error detection codes. What is also needed is a resynchronization procedure that allows a transmitter and receiver to be resynchronized during a session without having to terminate such session.

SUMMARY OF THE INVENTION

The present invention is a cryptographic apparatus and method for transmitting and receiving cryptographic information which provide a mechanism for resynchronization between a transmitter and receiver of the cryptographic information. A transmitter signature tag is generated at the transmitter which tag is transmitted with the cryptographic information. The transmitter signature tag is based on crypto-sync information which is available at the transmitter but which is not transmitted to the receiver. At the receiver, the cryptographic information and the transmitter signature tag are received. The transmitter signature tag is compared to a receiver signature tag generated by the receiver. The receiver signature tag is based on crypto-sync information available at the receiver.

When the tags are equal, the cryptographic information is deciphered to plain text. When the tags are not equal, it is an indication that the transmitter and receiver are not synchronized and thus the ciphered text can not be properly deciphered. In such a case, the crypto-sync information is modified N times (where N is an integer equal to or greater than 1) and for each modification a new receiver signature tag is generated and compared to the transmitter signature tag providing a mechanism for the receiver to resynchronize with the transmitter (i.e., new receiver signature tag is equal to transmitter signature tag). When the signature tags match (i.e., they are equal to each other) the receiver deciphers the receiver cipher text with the use of such parameters as the session key and the crypto-sync information.

BRIEF DESCRIPTION OF THE DRAWINGS

FIG. 2 is a block diagram of the receiver and transmitter of the present invention;

FIG. 3 shows the significance of the output of the crypto-sync modules when implemented as 32 bit counters.

DETAILED DESCRIPTION

Figure 1:
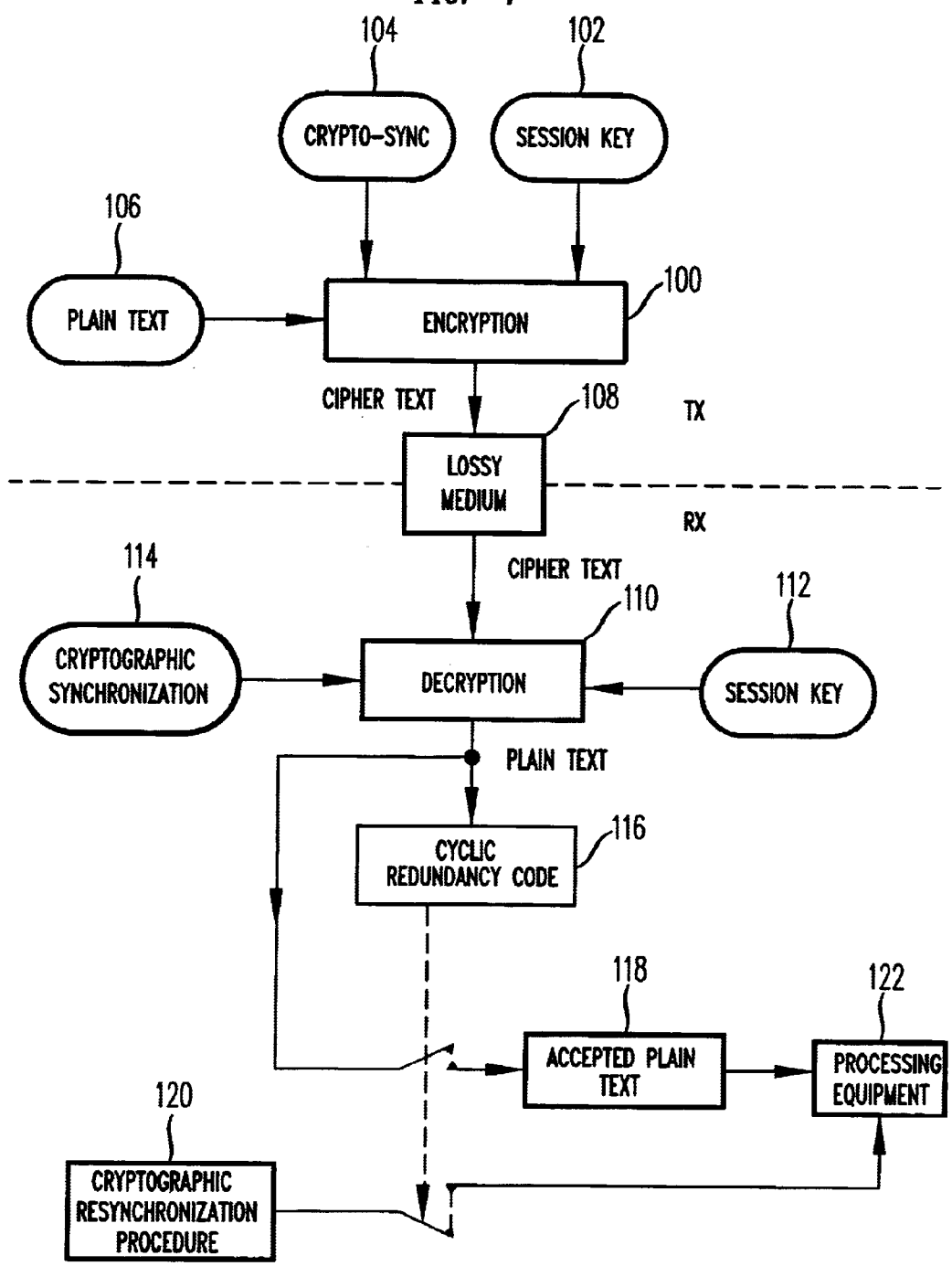
FIG. 1 is a block diagram of a typical cryptographic system.

Referring to FIG. 2, there is shown a block diagram of the receiver and transmitter of the present invention. For ease of explanation a transmitter is shown at one end of the lossy medium and a receiver is shown at another end of the lossy medium. It will be readily understood that at each end of the lossy medium, there is a receiver and a transmitter which are used to transmit and receive cryptographic information in accordance with the method of the present invention. It will be further understood that the lossy medium is not part of the present invention and is included to facilitate the description of the present invention.

At the transmitter, a transmitter signature tag (CS_H_TAG') is generated by signature module 202. The transmitter signature tag is based on crypto-sync information (CS_H') and the session key (SK). The transmitter signature tag and a portion (i.e., CS_L') of the contents of crypto-sync module 200 are appended to ciphered text from encryption module 206 and this combined information is transmitted over the lossy medium. It should be noted that the transmitter signature tag is not ciphered. At the receiver, the transmitter signature tag is compared to a receiver signature tag (CS_H_TAG) generated by signature block 210. The comparison is performed by comparison module 214. The receiver signature tag is based on crypto-sync information (i.e., CS_H) from module 208 and the session key from module 212. When the tags are equal, an ACCEPT signal is generated by module 214 and sent to logical gate 218 allowing the ciphered information to be deciphered into plain text by decryption module 216. When the tags are not equal, no ACCEPT signal is generated because unequal tags is an indication of lost of synchronization between the transmitter and receiver. In such a case, the crypto-sync information in module 208 is modified and a new receiver signature tag is generated thus providing a mechanism for the receiver to resynchronize with the transmitter. Each new receiver signature tag that is generated is compared to the transmitter signature tag to determine whether the receiver has resynchronized with the transmitter (i.e., whether the transmitter signature tag is equal to the receiver signature tag). The crypto-sync information in module 208 can be modified up to N times where N is an integer equal to or greater than one.

In a preferred embodiment, the crypto-sync information generated by and contained in modules 200 and 208 is arranged into two portions. For module 200 the portions are CS_H' and CS_L'. For module 208, the portions are CS_H and CS_L. A first portion (CS_H', CS_H) is used along with the session key to generate the signature tags (CS_H_TAG', CS_H_TAG) for the transmitter and receiver respectively. The transmitter signature tag and a second portion of the contents of crypto-sync module 200 (i.e., CS_L') are appended to each message that is transmitted. A message is a block of ciphered plain text. The signature tags for the transmitter and receiver are generated by signature function blocks 202 and 210 respectively. Signature function blocks 202 and 210 employ well known compression coding techniques that convert input information into compressed coded information. Compressed coded information is information which is represented by a lesser number of symbols than the number of symbols used in representing the input information. One version of compressed coded information is referred to as a digital signature for information represented in digital form.

Crypto-sync modules 200 and 208 can be implemented as L-bit counters where L is an integer equal to or greater than 2. For the sake of explanation, crypto-sync modules 200 and 208 are 32 bit counters (i.e., L=32) where CS_H' and CS_H represent the 24 upper or most significant bits and CS_L and CS_L' represent the 8 lower or least significant bits as shown in FIG. 3. At the beginning of a session, counters 200 and 208 are set to an initial value; for the sake of explanation the initial value is equal to zero.

At the transmitter, plain text to be transmitted is applied to encryption module 206 which generates a message or ciphered plain text. The upper 24 bits of the initial value of counter 200 is applied to signature function block 202 along with the Session Key (SK) value. Signature function block 202 applies a well known compression coding scheme to generate an 8-bit transmitter signature tag (CS_H_TAG'). The lower 8 bits of counter 200 (CS_L') are appended to the cipher text along with the transmitter signature tag to form a combined information block. For the sake of clarity, CS_L' (represented by the lower 8 bits) will hereinafter be referred to as the transmitter crypto-sync check information. The combined information block is then transmitted over the lossy medium or any other medium. For each subsequent message that is transmitted, counter 200 is incremented by one and the transmitter tag signature and the crypto-sync check information are generated and appended to the message as explained above. It should be noted that the crypto-sync check information (as well as the transmitter signature as explained above) is not ciphered.

At the receiver, the transmitter tag signature (CS_H_TAG')is compared to receiver tag signature (CS_H_TAG) by comparison module 214. CS_H is generated in the same manner as its transmitter counterparts (i.e., CS_H'). The received crypto-sync check information (CS_L') is appended to the CS_H thus producing the complete crypto-sync information that is used by decryption module 216 to decipher the received cipher text. Therefore, because the counters (200, 208) are set to the same initial values, the session keys are the same and the same signature function is performed at blocks 202 and 210, the signature tags should be the same. If the signature tags are the same, comparison block 214 generates an ACCEPT signal that allows the ciphered text to be presented through logic gate 218 to Decryption module 216 and deciphered into plain text As with the transmitter, for each received message counter 208 is incremented by one and the corresponding receiver signature tag (CS_H_TAG) is generated in the same manner as discussed above. Although not shown, Crypto-sync module 208 generates crypto-sync check information in the same manner as crypto-sync module 200. For simplicity of design, the crypto-sync check information generated by module 200 (CS_L') is used to form the crypto-sync information (CS) used by module 216 for decrypting ciphered text.

When the tag signatures transmitter are not the same, comparison block 214 does not generate the ACCEPT signal and thus the cipher text is not presented by the receiver for deciphering. In such a case counter 208 is incremented by one and a comparison is again performed. If the tag signatures and the crypto-sync check information are the same, then the receiver has resynchronized with the transmitter. Otherwise, counter 208 is again incremented and another comparison is performed. The incrementing and comparison procedure is limited to a certain number of times defined by a system operator or whichever entity that controls the transmitter and/or receiver equipment. When the amount of increments allowed is reached and resynchronization has not occurred, the session is terminated and a resynchronization procedure is initiated in accordance with whichever protocol is being followed by the communication system in which the TX and RX apparatus of the present invention are located.

In the example discussed above where the crypto-sync check information is 8 bits long and the tag signatures are generated partly from the 24 upper bits of the crypto-sync counter, a tag signature (i.e., transmitter and receiver) is generated once every 256 messages. In other words a tag signature is generated at the beginning of a session, at the $256^{th}$ message of the session and so on. Thus, the same tag signature is appended to 256 consecutive messages along with 256 different crypto-sync check information each of which is simply one count of 256 counts of the lower 8 bits of the crypto-sync counters. Because the signature tag changes only once after every 256 messages, it is calculated once every 256 messages thus resulting in more efficient utilization of processing power. Because the signature tags are represented by only 8 bits (i.e., compression of 24 upper bits with Session Key), relatively more information can be ciphered and transmitted compared to the CRC technique of the prior art. It is thus in this manner that the method and apparatus of the present invention is able to provide a mechanism for automatic resynchronization of a receiver to a transmitter while providing an efficient method for detecting when such receiver has lost synchronization with the transmitter.

We claim:

1. Apparatus comprising:
   means for receiving from a transmitter a) ciphered text generated as a function of a session key and crypto-sync information generated at said transmitter, along with b) a transmitter tag wherein said transmitter tag is a function of said session key and said crypto-sync information,
   a session key module for generating a local session key,
   a cryptographic synchronization module for producing and modifying local crypto-sync information,
   a decryption module wherein said decryption module uses said local session key and said local crypto-sync information for decrypting said ciphered text,
   a signature function module for generating a receiver tag wherein said receiver tag is a function of said local session key and said local crypto-sync information; and
   a comparator for comparing said receiver tag with said transmitter tag, said cryptographic synchronization module being configured for modifying said local crypto-sync information if said receiver and transmitter tags are different, said modifying being such as to make said receiver and transmitter tags the same, thereby allowing said apparatus to resynchronize with said transmitter.

2. The apparatus of claim 1, wherein said cryptographic synchronization module is configured to modify said local crypto-synch information less than N+1 times, where N is an integer equal to at least 1, if the receiver and transmitter tags are different.

3. The apparatus of claim 2, wherein each modification of said local crypto-synch information causes a new receiver tag to be generated.

4. The apparatus of claim 3, wherein said comparator compares each said new receiver tag with said transmitter tag to determine if said receiver and transmitter tags are the same, and thus if resynchronization of said apparatus is necessary and thus if the generation of another said new receiver tag is necessary.

5. The apparatus of claim 1, wherein said local crypto-sync information has a value that is changed based on a predetermined algorithm in tandem with changes made, based on said predetermined algorithm, to the value of said crypto-sync information generated at said transmitter.

6. A method for resynchronizing a receiver to a transmitter, the method comprising:

receiving from a transmitter a) ciphered text generated as a function of a session key and crypto-sync information generated at said transmitter, along with b) a transmitter tag wherein said transmitter tag is a function of said session key and said crypto-sync information, generating a local session key, producing local crypto-sync information, generating a receiver tag wherein said receiver tag is a function of said local session key and said local crypto-sync information;

comparing said receiver tag to said transmitter tag; and modifying said local crypto-sync information to generate a new receiver tag if the receiver and transmitter tags are different, said modifying being such as to make said receiver and transmitter tags the same, thereby resynchronizing said receiver to said transmitter.

7. The method of claim 6, wherein the step of modifying the said local crypto-sync information to generate a new receiver tag comprises modifying said local crypto-synch information less than N+1 times, where N is an integer equal to at least 1, if the receiver and transmitter tags are different.

8. The method of claim 7, wherein the step of modifying the said local crypto-sync information to generate said new receiver tag comprises generating a new receiver tag in response to each modification of said local crypto-synch information.

9. The method of claim 8, wherein the step of modifying said local crypto-sync information to generate a new receiver tag comprises comparing said new receiver tag with said transmitter tag to determine if the generation of another said new receiver tag is necessary for resynchronization.

10. The method of claim 6, wherein said local crypto-sync information has a value that is changed based on a predetermined algorithm in tandem with changes made, based on said predetermined algorithm, to the value of said crypto-sync information generated at said transmitter.

11. Apparatus comprising:

a session key module for generating a session key, a cryptographic synchronization module for producing crypto-sync information, an encryption module for generating ciphered text wherein said ciphered text is a function of plain text, said crypto-sync information, and said session key, a signature function module for generating a tag wherein said tag is a function of said crypto-sync information and said session key, and means for transmitting said tag along with said ciphered text to a receiver.

12. The apparatus of claim 11, wherein said crypto-sync information has a value that is changed based on a predetermined algorithm, whereby said apparatus and said receiver remain in synchronization as long as a value of said crypto-sync information maintained in said receiver is changed in accordance with said algorithm.

13. Apparatus comprising:

means for receiving from a transmitter a) ciphered text generated as a function of a session key and crypto-sync information generated at said transmitter, along with b) a transmitter tag that is a predetermined function of said session key and said crypto-sync information, a signature function module for generating a receiver tag that is said predetermined function of said session key and local crypto-sync information generated by a cryptographic synchronization module;

a comparator for comparing said transmitter tag with said receiver tag, said cryptographic synchronization module being configured for modifying said local crypto-sync information if said first and receiver tags are different, said modifying being such as to make said first and receiver tags the same, and a decryption module for decrypting said ciphered text as a function of said session key and said local crypto-sync information.

14. Apparatus for decrypting ciphered text received from a transmitter, said ciphered text having been generated as a function of a session key and crypto-sync information generated at said transmitter, said ciphered text being accompanied by a first tag that is a predetermined function of said session key and said crypto-sync information, said apparatus comprising:

means for comparing said first tag with a second tag, said second tag being said predetermined function of said session key and local crypto-sync information, and for modifying said local crypto-sync information if said second tag is different from said first tag, said modifying being such as to make said second tag the same as said first tag, and a decryption module for decrypting said ciphered text as a function of said session key and said local crypto-sync information once said second tag is the same as said first tag.

* * * * *